(12) United States Patent
Irlbeck et al.

(10) Patent No.: US 8,061,129 B2
(45) Date of Patent: Nov. 22, 2011

(54) SYSTEM AND METHOD TO REGENERATE A DIESEL PARTICULATE FILTER

(75) Inventors: Jill N. Irlbeck, Bloomington, MN (US);
Erich Albert Lucht, Arden Hills, MN (US); John Hiemstra, Lakeville, MN (US); Allan T. Hovda, Savage, MN (US); John Jacob Shaw, Burnsville, MN (US); Gary Reeves, Lakeville, MN (US); Greg Truckenbrod, Fridley, MN (US); Wenzhong Zhang, Savage, MN (US); John Wiese, Lakeville, MN (US); Eivind Stenersen, River Falls, WI (US); Scott Peters, Woodbury, MN (US); Derek Hiemstra, Prior Lake, MN (US); Josh Kundert, Burnsville, MN (US)

(73) Assignee: Thermo King Corporation and Donaldson Company, Inc., Minneapolis, MN (US)

( * ) Notice: Subject to any disclaimer, the term of this patent is extended or adjusted under 35 U.S.C. 154(b) by 549 days.

(21) Appl. No.: 12/362,975

(22) Filed: Jan. 30, 2009

(65) Prior Publication Data
US 2010/0192548 A1 Aug. 5, 2010

(51) Int. Cl.
*F01N 3/00* (2006.01)
*F01N 3/10* (2006.01)
(52) U.S. Cl. .............. 60/295; 60/291; 60/300; 60/303
(58) Field of Classification Search .............. 60/295
See application file for complete search history.

(56) References Cited

U.S. PATENT DOCUMENTS

| | | | |
|---|---|---|---|
| 4,589,254 A | 5/1986 | Kume et al. | |
| 5,388,400 A | 2/1995 | Hoppenstedt et al. | |
| 5,423,180 A | 6/1995 | Nobue et al. | |
| 6,594,990 B2 | 7/2003 | Kuenstler et al. | |
| 6,756,904 B2 | 6/2004 | Kinugawa et al. | |
| 6,829,890 B2 | 12/2004 | Gui et al. | |
| 6,865,883 B2 | 3/2005 | Gomulka | |
| 6,901,751 B2 | 6/2005 | Bunting et al. | |
| 6,951,098 B2 | 10/2005 | Xu et al. | |
| 7,028,467 B2 | 4/2006 | Kuboshima et al. | |
| 7,043,903 B2 | 5/2006 | Onodera et al. | |
| 7,048,891 B2 | 5/2006 | Kinugawa et al. | |
| 7,104,050 B2 | 9/2006 | Sato et al. | |
| 7,159,384 B2 | 1/2007 | Otake et al. | |
| 7,168,244 B2 | 1/2007 | Iizuka et al. | |
| 7,171,803 B2 | 2/2007 | Saito et al. | |
| 7,181,909 B2 | 2/2007 | Sato et al. | |
| 7,254,940 B2 | 8/2007 | Saitoh et al. | |
| 7,275,365 B2 | 10/2007 | Zhan et al. | |
| 7,316,107 B2 | 1/2008 | Aratsuka et al. | |

(Continued)

*Primary Examiner* — Thomas Denion
*Assistant Examiner* — Jason Shanske
(74) *Attorney, Agent, or Firm* — Michael Best & Friedrich LLP

(57) ABSTRACT

An exhaust system for use with a diesel engine includes a diesel particulate filter configured to capture particulate matter exhausted from the diesel engine, a first sensor operable to detect a particulate matter accumulation level within the diesel particulate filter, and a second sensor operable to detect an ambient temperature of an environment surrounding the diesel particulate filter. The exhaust system also includes a control module electrically coupled to the first sensor, the second sensor, and the diesel particulate filter. The control module is operable to adjust a first regeneration threshold based on the detected ambient temperature. The control module is also operable to initiate regeneration of the diesel particulate filter when the detected particulate matter accumulation level reaches the first regeneration threshold.

25 Claims, 3 Drawing Sheets

U.S. PATENT DOCUMENTS

| | | |
|---|---|---|
| 7,322,182 B2 | 1/2008 | Ueno et al. |
| 7,322,184 B2 | 1/2008 | Kondou et al. |
| 7,370,470 B2 | 5/2008 | Graupner et al. |
| 7,421,837 B2 | 9/2008 | Abe |
| 2004/0226287 A1 | 11/2004 | Edgar et al. |
| 2005/0188686 A1* | 9/2005 | Saito et al. ............. 60/297 |
| 2005/0198944 A1* | 9/2005 | Saitoh et al. ............ 60/295 |
| 2005/0223700 A1 | 10/2005 | Abe |
| 2006/0026950 A1* | 2/2006 | Kondou et al. .......... 60/297 |
| 2006/0075744 A1 | 4/2006 | Smaling |
| 2006/0086095 A1 | 4/2006 | Da-Silva et al. |
| 2007/0074508 A1 | 4/2007 | Tomlins et al. |
| 2007/0101702 A1 | 5/2007 | Saito |
| 2007/0214778 A1 | 9/2007 | Narita et al. |
| 2007/0234711 A1 | 10/2007 | Berke et al. |
| 2007/0234712 A1 | 10/2007 | Ohmura |
| 2007/0251221 A1 | 11/2007 | Lueschow et al. |
| 2007/0261395 A1* | 11/2007 | Mahnken et al. ........ 60/297 |
| 2007/0271906 A1 | 11/2007 | Berke et al. |
| 2008/0093153 A1 | 4/2008 | Gudorf |
| 2008/0104948 A1 | 5/2008 | Kapparos et al. |
| 2008/0148709 A1 | 6/2008 | Miller et al. |
| 2008/0155963 A1 | 7/2008 | Iida |
| 2008/0155965 A1 | 7/2008 | Henderson et al. |
| 2008/0163609 A1 | 7/2008 | Satou et al. |
| 2008/0163610 A1 | 7/2008 | Baird et al. |

* cited by examiner

SYSTEM AND METHOD TO REGENERATE A DIESEL PARTICULATE FILTER

BACKGROUND

The present invention relates to diesel particulate filters and, more particularly, to systems and methods to regenerate diesel particulate filters.

Typically, diesel particulate filters (DPFs) are positioned in exhaust systems to remove particulate matter and soot from exhaust generated by diesel engines. Over time, the DPFs may become overly filled with the particulate matter and soot, which may result in a loss of effectiveness. As such, it is necessary to periodically clean, regenerate, or replace the DPFs. Various methods and means exist to detect when a DPF is full or becoming full. However, such methods and means are usually based on fixed operating parameters and do not account for the current operating environment of a particular DPF.

SUMMARY

In one embodiment, the invention provides an exhaust system for use with a diesel engine. The exhaust system includes a diesel particulate filter configured to capture particulate matter exhausted from the diesel engine, a first sensor operable to detect a particulate matter accumulation level within the diesel particulate filter, and a second sensor operable to detect an ambient temperature of an environment surrounding the diesel particulate filter. The exhaust system also includes a control module electrically coupled to the first sensor, the second sensor, and the diesel particulate filter. The control module is operable to adjust a first regeneration threshold based on the detected ambient temperature. The control module is also operable to initiate regeneration of the diesel particulate filter when the detected particulate matter accumulation level reaches the first regeneration threshold.

In another embodiment, the invention provides a system including a diesel engine, a diesel particulate filter in communication with the diesel engine to capture particulate matter exhausted from the diesel engine, and a first sensor coupled to at least one of the diesel engine and the diesel particulate filter. The first sensor is operable to detect a particulate matter accumulation level within the diesel particulate filter. The system also includes a second sensor operable to detect an ambient temperature of an environment surrounding the diesel particulate filter and a control module electrically coupled to the first sensor, the second sensor, and the diesel particulate filter. The control module is operable to adjust a first regeneration threshold based on the detected ambient temperature. The control module is also operable to initiate regeneration of the diesel particulate filter when the detected particulate matter accumulation level reaches the first regeneration threshold.

In yet another embodiment, the invention provides a method of regenerating a diesel particulate filter. The diesel particulate filter is configured to capture particulate matter exhausted from a diesel engine. The method includes detecting a particulate matter accumulation level within the diesel particulate filter with a first sensor, detecting an ambient temperature of an environment surrounding the diesel particulate filter with a second sensor, adjusting a first regeneration threshold based on the detected ambient temperature, and initiating regeneration of the diesel particulate filter when the detected particulate matter accumulation level reaches the first regeneration threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
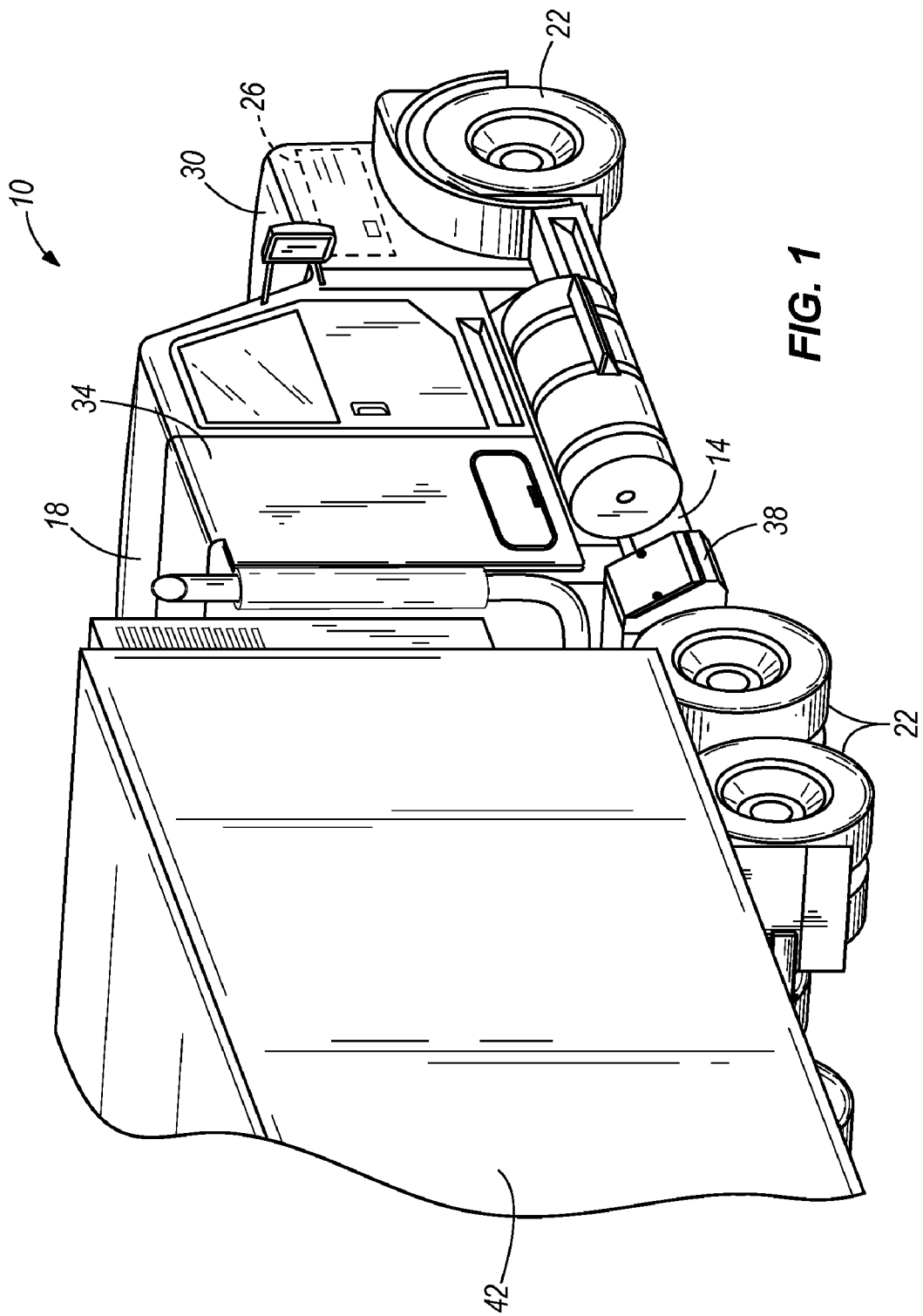
FIG. 1 is a perspective view of a vehicle including an auxiliary power unit and an exhaust system embodying the invention.

FIG. 1 illustrates a vehicle 10 including a frame 14, a vehicle body 18 supported by the frame 14, a plurality of wheels 22 rotatably coupled to the frame 14, an engine 26 positioned in a forward compartment 30 of the vehicle body 18, a cabin 34 defined by the vehicle body 18, and an auxiliary power unit 38. In the illustrated construction, the vehicle 10 is a conventional semi-tractor for pulling a trailer 42, but may alternatively be a different type of similar vehicle. The illustrated engine 26 is a diesel engine that is operable to drive the wheels 22 and power various components of the vehicle 10. In other constructions, the engine 26 may be another type of prime mover or power unit suitable for driving and powering the vehicle 10.

Figure 2:
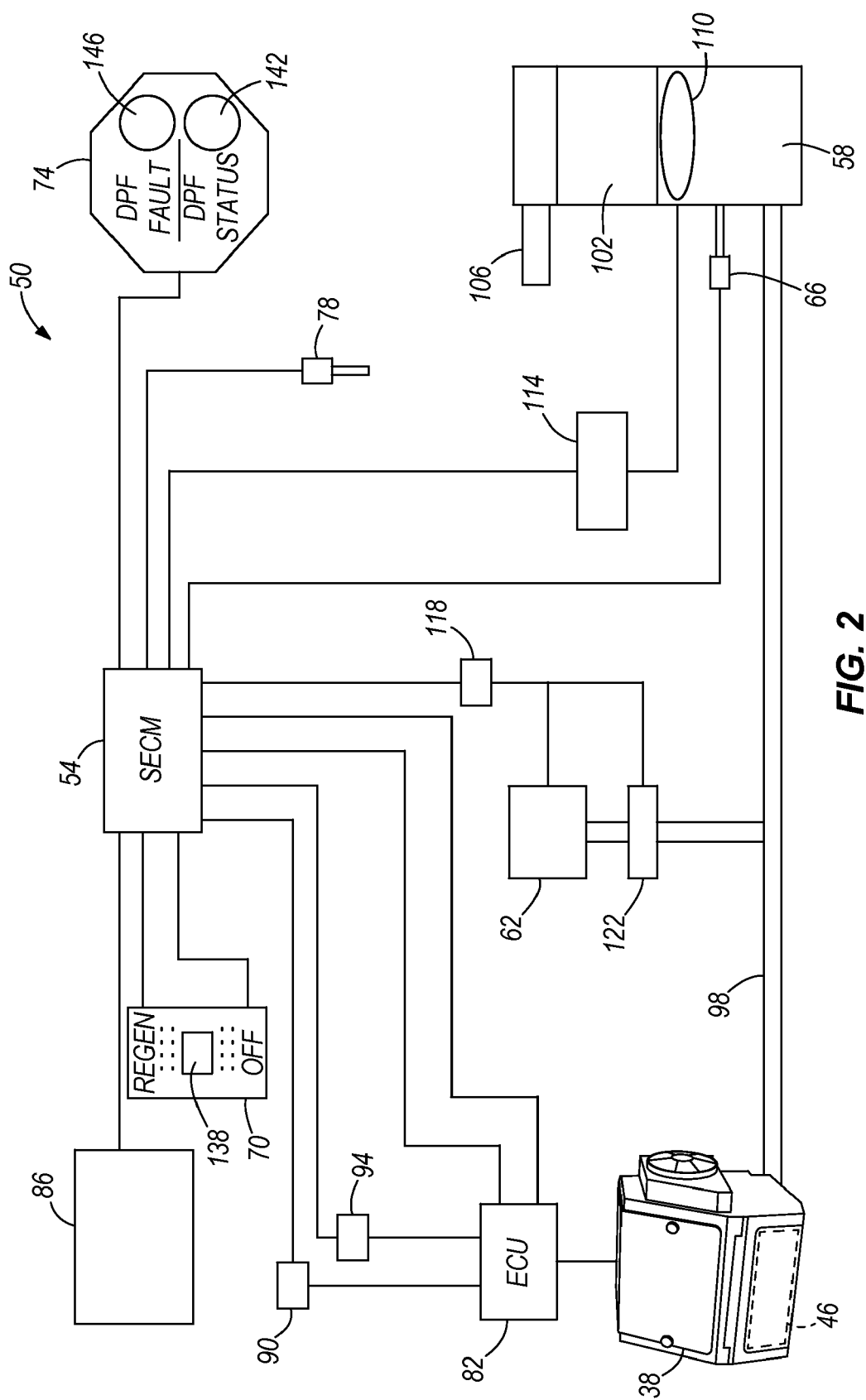
FIG. 2 is a schematic of the auxiliary power unit and the exhaust system.

The auxiliary power unit 38 is coupled to the frame 14 rearward of the cabin 34. The illustrated power unit 38 is operable to provide power to various components of the vehicle 10 when the primary vehicle engine 26 is disengaged. In some constructions, the auxiliary power unit 38 powers an HVAC system in communication with the cabin 34 of the vehicle 10 to control the environment in the cabin 34 while a driver is resting or sleeping. Additionally or alternatively, the auxiliary power unit 38 may provide power for running or charging various peripheral devices such as, for example, a 12-volt battery charger, a television, a radio, or the like. In the illustrated construction, the auxiliary power unit 38 is powered by a two-cylinder diesel engine 46 (FIG. 2). In other constructions, the auxiliary power unit 38 may be powered by other suitable types and/or sizes of engines.

As shown in FIG. 2, an exhaust system 50 is coupled to the auxiliary power unit 38. The illustrated exhaust system 50 includes a control module 54, a diesel particulate filter 58 (DPF), a blower 62, an exhaust pressure sensor 66, a control switch 70, a system indicator 74, and an ambient temperature sensor 78. The control module 54 is electrically coupled to an electronic control unit 82 (ECU) of the auxiliary power unit 38 and to the other components of the exhaust system 50 to receive, process, and transmit information to and from the components. The control module 54 is also coupled to an ignition 86 of the vehicle 10 such that the control module 54 receives status information from the primary engine 26 of the vehicle 10. In the illustrated construction, the control module 54 is a small engine control module (SECM) that is compatible with the diesel engine 46 of the auxiliary power unit 38. The control module 54 receives ignition and engine running status from the auxiliary power unit 38 so that the control module 54 can monitor when and at what strength the auxiliary power unit 38 is running. The control module 54 is also operable to sends signals to the ECU 82 through relays 90, 94 to interrupt and/or shutdown operation of the auxiliary power unit 38.

The DPF 58 is positioned downstream of the engine 46 of the auxiliary power unit 38 to receive exhaust from the engine 46 through an exhaust pipe 98. In the illustrated construction, the DPF 58 is an electrically-powered active DPF. The DPF 58 includes a filter element 102 operable to remove particulate matter and soot from exhaust exiting the engine 46. In the illustrated construction, the filter element 102 is a non-catalyzed, silicon-carbide wall-flow exhaust filter element, although other suitable filter elements may also or alternatively be employed. Exhaust flows from the diesel engine 46, through the exhaust pipe 98, and into the DPF 58. As the exhaust travels through the DPF 58, the exhaust flows through the filter element 102 such that clean exhaust is released into the environment through an outlet 106 of the DPF 58. During such operation, particulate matter and soot gradually build-up and collect on the filter element 102. Once the amount of particulate matter accumulated on the filter element 102 reaches a certain level or threshold, the DPF 58 should be regenerated to clean the filter element 102.

In the illustrated construction, the exhaust system 50 also includes a heating element 110 electrically coupled to the control module 54. The heating element 110 is positioned adjacent to or within the filter element 102 of the DPF 58 to heat the filter element 102 and thereby promote regeneration. The illustrated heating element 110 is an integrated 12-volt high current electrical coil operable to radiate heat for an extended period of time (e.g., one hour or more) to regenerate the filter element 102. A contactor 114 is electrically coupled between the control module 54 and the heating element 110 to help control the power input to the heating element 110. In other constructions, other suitable regeneration promoting means may be employed as an alternative to or in conjunction with the illustrated heating element 110.

The blower 62 is coupled to the control module 54 through a relay 118. In the illustrated construction, the blower 62 is in communication with the exhaust pipe 98 to supply oxygenated ambient air, when a valve 122 is open, to exhaust exiting the engine 46 of the auxiliary power unit 38. The ambient air helps sustain oxidation of particulate matter and soot in the exhaust during regeneration of the DPF 58. The valve 122 (e.g., a solenoid valve) is positioned between the blower 62 and the exhaust pipe 98 and is also coupled to the control module 54 through the relay 118. During normal operation of the auxiliary power unit 38 (i.e., not during regeneration of the DPF 58), the valve 122 is closed to inhibit exhaust in the pipe 98 from entering the blower 62, and thereby bypassing the DPF 58.

The exhaust pressure sensor 66 is coupled to the DPF 58 and the control module 54 to notify the control module 54 when the DPF 58 should be regenerated. In the illustrated construction, the exhaust pressure sensor 66 is a single sensor positioned upstream of the filter element 102 to measure exhaust backpressure within the DPF 58. The measured backpressure pressure generally corresponds to a particulate matter accumulation level on the filter element 102. When the measured backpressure reaches or exceeds a predetermined value (i.e., a regeneration threshold), the control module 54 notifies a user to initiate regeneration of the DPF 58. In some constructions, the regeneration threshold indicates when a sufficient amount of particulate matter has accumulated on the filter element 102 to support regeneration. In other constructions, the regeneration threshold is set a predetermined length of time before the particulate matter and soot accumulates to a level where the DPF 58 can no longer function properly.

In still other constructions, the exhaust pressure sensor 66 may be replaced with a differential pressure sensor operable to measure the differential pressure across the filter element 102. When the measured differential pressure reaches or exceeds the regeneration threshold, the control module 54 notifies a user to initiate regeneration of the filter element 102. Alternatively, the exhaust pressure sensor 66 may be replaced with an optical sensor to directly measure particulate matter accumulation on the filter element 102, with an acoustic sensor to measure particulate matter accumulation on the filter element 102 by transmitting and receiving sound waves through the filter element 102, or with other suitable sensing means.

In further constructions, the exhaust system 50 may additionally or alternatively include an engine runtime sensor. In such constructions, the runtime sensor is coupled to the engine 46 and the ECU 82 of the auxiliary power unit 38. The runtime sensor monitors how long and/or at what speeds the engine 46 has been running. Similar to exhaust backpressure, engine runtime and operation speed generally correspond to the accumulation level of particulate matter and soot on the filter element 102 of the DPF 58. After the engine 46 runs for a predetermined length of the time, the ECU 82 signals the control module 54 to notify a user to initiate regeneration of the DPF 58.

The control switch 70 is electrically coupled to the control module 54 and is positioned within the cabin 34 (FIG. 1) of the vehicle 10. The control switch 70 allows a user (e.g., the driver or passenger of the vehicle 10) to start regeneration of the DPF 58 at his or her convenience. Regeneration of the DPF 58 typically requires electrical power for an extended period of time (e.g., more than an hour). With the switch 70, the user can initiate regeneration when he or she knows the primary vehicle engine 26 will be kept at or above approximately 1150 revolutions per minute during this time. The DPF 58 can therefore be regenerated using only excess power from the primary engine 26, without requiring supplemental power from vehicle batteries or from another external power source.

Figure 3:
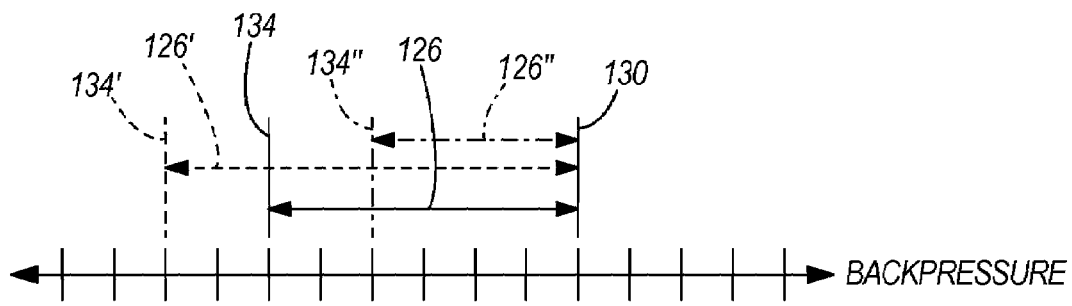
FIG. 3 is a graph depicting a regeneration window of a diesel particulate filter at various ambient temperatures.

As shown in FIG. 3, regeneration of the DPF 58 (FIG. 2) is typically carried out within a predetermined, set time period (i.e., a regeneration window 126). The regeneration window 126 is defined between an upper regeneration threshold 130 and a lower regeneration threshold 134. The upper regeneration threshold 130 generally corresponds to a high particulate matter and soot accumulation level on the element 102 that renders the DPF 58 non-operational. When the upper regeneration threshold is reached, the auxiliary power unit 38 and the DPF 58 shutdown. In the illustrated construction, this maximum accumulation level generally corresponds to a preprogrammed maximum exhaust backpressure. The lower regeneration threshold 134 is set relative to the upper regeneration threshold 130 such that the regeneration window 126 is a known length of time. For example, the lower regeneration threshold 134 may correspond to an exhaust backpressure value that is reached approximately ten hours before the maximum exhaust backpressure is reached. A user therefore knows the engine 46 of the auxiliary power unit 38 can run for approximately ten more hours before the upper regeneration threshold 130 is reached.

Referring back to FIG. 2, the illustrated control switch 70 is a three-position switch that is movable between a home position, a regeneration position, and an off position. The control switch 70 is normally biased to the home, or middle, position. In the home position, the auxiliary power unit 38 and the DPF 58 are operational such that the DPF 58 filters particulate matter and soot from exhaust exiting the engine 46 of the auxiliary power unit 38. Actuating (e.g., depressing) the switch 70 to the regeneration, or upper, position initiates regeneration of the DPF 58. In the illustrated construction, the regeneration position is a momentary position that begins the regeneration. Once released, the switch 70 is immediately biased back to the home position, but regeneration of the DPF 58 continues until it is completed or interrupted. Actuating (e.g., depressing) the switch 70 to the off, or lower, position cuts off power to the auxiliary power unit 38 and the DPF 58, interrupting operation of the auxiliary power unit 38 and/or regeneration of the DPF 58. In the illustrated construction, the off position is a latching position such that the switch 70 remains in the off position until it is manually actuated back to the home position or the regeneration position.

The illustrated control switch 70 includes a light emitting diode 138 (LED) that indicates the current status of the DPF 58. In the illustrated construction, the LED 138 turns on to notify a user to regenerate the DPF 58 (e.g., when the measured exhaust backpressure reaches or exceeds the lower regeneration threshold 134 (FIG. 3)). In some constructions, the LED 138 may blink while the DPF 58 is regenerating and/or may turn off when the auxiliary power unit 38 and the DPF 58 are disabled or otherwise shutdown. In other constructions, the switch 70 may include multiple LEDs and/or different types of indicators to notify a user of the status of the auxiliary power unit 38 and the DPF 58.

The system indicator 74 is electrically coupled to the control module 54 and is positioned within a sleeping section of the cabin 34 (FIG. 1) of the vehicle 10. The indicator 74 generally provides the same information to a user as the control switch 70, but at a different location within the vehicle cabin 34. The illustrated indicator 74 includes a first LED 142 to notify a user of the current status of the DPF 58 (e.g., if the DPF 58 needs to be regenerated, is regenerating, and/or is off). The indicator 74 also includes a second LED 146 to notify the user if there is a fault with the auxiliary power unit 38 and/or the DPF 58.

The ambient temperature sensor 78 is electrically coupled to the control module 54 and is mounted to the frame 14 or the body 18 of the vehicle 10 (FIG. 1). In the illustrated construction, the temperature sensor 78 is a thermistor or other suitable temperature sensing transducer. The temperature sensor 78 monitors the temperature of the environment and outputs a signal indicative of the measured temperature to the control module 54. Ambient temperature generally affects the rate at which particulate matter and soot accumulate on the filter element 102 of the DPF 58. At relatively lower ambient temperatures, particulate matter and soot accumulate faster on the filter element 102. At relatively higher ambient temperatures, particulate matter and soot accumulate slower on the filter element 102. The control module 54 therefore uses the measured ambient temperature to adjust the lower regeneration threshold 134 (FIG. 3) of the DPF 58, thereby compensating for environmental effects on the exhaust system 50.

Figure 4:
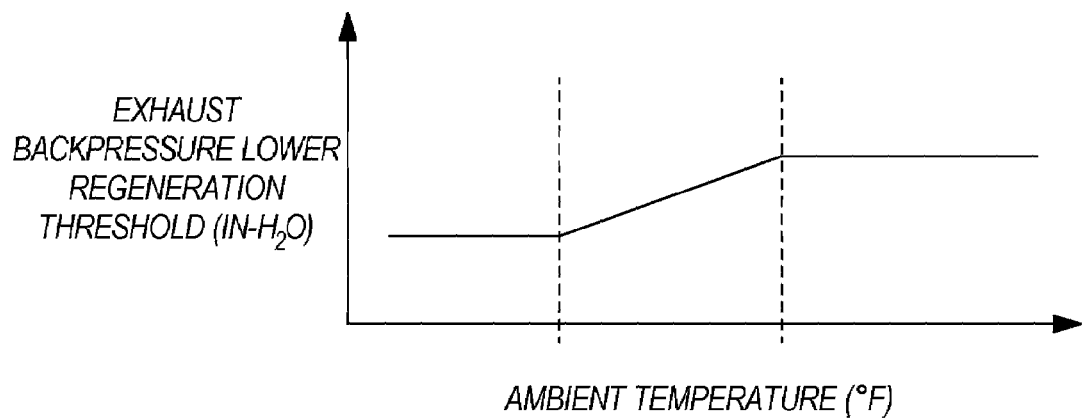
FIG. 4 is a graph depicting an exhaust backpressure regeneration threshold of a diesel particulate filter versus ambient temperature.

FIG. 4 generally depicts the effect of different ambient temperatures on the lower regeneration threshold 134 (FIG. 3). As shown in the graph, at relatively low ambient temperatures, the exhaust backpressure regeneration threshold 134 is decreased to a lower exhaust backpressure (e.g., to the lower regeneration threshold 134' shown in FIG. 3). At relatively high ambient temperatures, the lower regeneration threshold 134 is increased to a higher exhaust backpressure (e.g., to the lower regeneration threshold 134" shown in FIG. 3). In the illustrated construction, the relationship between the ambient temperature and the exhaust backpressure regeneration threshold is generally linear. However, at relatively extreme low and high ambient temperatures, the relationship is generally steady such that the graph plateaus. In other constructions, the relationship between the ambient temperature and the exhaust backpressure regeneration threshold may be non-linear (e.g., parabolic, exponential, etc.). The relationship is generally unique to different types of engines (e.g., engines with different duty cycles) and/or applications of the engines (e.g., engines used in different equipment).

Referring to FIG. 3, the upper regeneration threshold 130 (e.g., the preprogrammed maximum exhaust backpressure) remains generally constant regardless of the ambient temperature. However, at relatively low ambient temperatures, the control module 54 reduces the lower regeneration threshold 134' to compensate for faster accumulation of particulate matter and soot on the filter element 102 of the DPF 58. Conversely, at relatively high ambient temperatures, the control module 54 raises the lower regeneration threshold 134" to compensate for slower accumulation of particulate matter and soot on the filter element 102. The control module 54 thereby adjusts the lower regeneration threshold 134 such that the regeneration window 126, 126', 126" remains generally constant. That is, the time between when the control switch 70 (FIG. 2) first notifies a user to regenerate the DPF 58 (e.g., when the measured exhaust backpressure reaches the lower regeneration threshold 134, 134', 134") to the time when the particulate matter accumulation level is at a maximum level (e.g., when the measured exhaust backpressure reaches the upper regeneration threshold 130) is always approximately the same length of time (e.g., approximately ten hours). A user therefore knows how long he or she has to regenerate the DPF 58 before the auxiliary power unit 38 and the DPF 58 shutdown and become non-operational. The user can then choose to initiate regeneration at his or her convenience, and particularly when he or she expects the primary vehicle engine 26 to be running for an extended length of time.

The illustrated exhaust system 50 allows a user to more accurately determine when the DPF 58 needs to be regenerated by compensating for ambient temperature effects on the system 50. In the illustrated construction, the exhaust system 50 monitors particulate matter and soot accumulation levels in the DPF 58 and environmental conditions using relatively few monitoring components. For example, particulate matter and soot accumulation is monitored using one sensor (e.g., the pressure sensor 66, an engine runtime sensor, or the like) and ambient temperature is monitored using a second sensor (e.g., the ambient temperature sensor 78), allowing the system 50 to be easily programmed and customized for different operating conditions.

Although the illustrated exhaust system 50 is illustrated and described for use with an auxiliary power unit of a semi-tractor, it should be readily apparent that in other constructions the exhaust system 50 may be used with any power source or unit that emits diesel exhaust. For example, in some constructions, the exhaust system 50 may be in communication with a primary diesel engine of a vehicle, a stand-alone diesel-powered generator, a diesel engine of a transport refrigeration unit on a trailer, or the like. In addition, the exhaust system 50 may be modified for use with other types of filters that require periodic regeneration.

Various features and advantages of the invention are set forth in the following claims.

What is claimed is:

1. An exhaust system for use with a diesel engine, the exhaust system comprising:
    a diesel particulate filter configured to capture particulate matter exhausted from the diesel engine;
    a first sensor operable to detect a particulate matter accumulation level within the diesel particulate filter;
    a second sensor operable to detect an ambient temperature of an environment surrounding the diesel particulate filter; and
    a control module electrically coupled to the first sensor, the second sensor, and the diesel particulate filter, the control module operable to adjust a first regeneration threshold based on the detected ambient temperature and to initiate regeneration of the diesel particulate filter when the detected particulate matter accumulation level reaches the first regeneration threshold.

2. The exhaust system of claim 1, wherein the control module increases the first regeneration threshold when the detected ambient temperature increases.

3. The exhaust system of claim 1, wherein the control module decreases the first regeneration threshold when the detected ambient temperature decreases.

4. The exhaust system of claim 1, wherein the control module initiates regeneration within a regeneration window defined between the first regeneration threshold and a second regeneration threshold, and wherein the second regeneration threshold corresponds to a maximum particulate matter accumulation level within the diesel particulate filter.

5. The exhaust system of claim 4, wherein the first regeneration threshold is set a predetermined length of time before the detected particulate matter accumulation level reaches the second regeneration threshold.

6. The exhaust system of claim 5, wherein the regeneration window remains constant as the control module adjusts the first regeneration threshold relative to the second regeneration threshold to compensate for the detected ambient temperature.

7. The exhaust system of claim 1, wherein the first sensor is a pressure sensor coupled to the diesel particulate filter to detect exhaust backpressure within the diesel particulate filter, and wherein the detected exhaust backpressure corresponds to the particulate matter accumulation level.

8. The exhaust system of claim 1, further comprising a heating element coupled to the diesel particulate filter and the control module, wherein the control module activates the heating element to heat the diesel particulate filter during regeneration.

9. A system comprising:
    a diesel engine;
    a diesel particulate filter in communication with the diesel engine to capture particulate matter exhausted from the diesel engine;
    a first sensor coupled to at least one of the diesel engine and the diesel particulate filter, the first sensor operable to detect a particulate matter accumulation level within the diesel particulate filter;
    a second sensor operable to detect an ambient temperature of an environment surrounding the diesel particulate filter; and
    a control module electrically coupled to the first sensor, the second sensor, and the diesel particulate filter, the control module operable to adjust a first regeneration threshold based on the detected ambient temperature and to initiate regeneration of the diesel particulate filter when the detected particulate matter accumulation level reaches the first regeneration threshold.

10. The system of claim 9, wherein the control module increases the first regeneration threshold when the detected ambient temperature increases.

11. The system of claim 9, wherein the control module decreases the first regeneration threshold when the detected ambient temperature decreases.

12. The system of claim 9, wherein the control module initiates regeneration within a regeneration window defined between the first regeneration threshold and a second regeneration threshold, and wherein the second regeneration threshold corresponds to a maximum particulate matter accumulation level within the diesel particulate filter.

13. The system of claim 12, wherein the first regeneration threshold is set a predetermined length of time before the detected particulate matter accumulation level reaches the second regeneration threshold.

14. The system of claim 13, wherein the regeneration window remains constant as the control module adjusts the first regeneration threshold relative to the second regeneration threshold to compensate for the detected ambient temperature.

15. The system of claim 9, wherein the first sensor is a pressure sensor coupled to the diesel particulate filter to detect exhaust backpressure within the diesel particulate filter, and wherein the detected exhaust backpressure corresponds to the particulate matter accumulation level.

16. The system of claim 9, further comprising a heating element coupled to the diesel particulate filter and the control module, wherein the control module activates the heating element to heat the diesel particulate filter during regeneration.

17. The system of claim 9, wherein the diesel engine is part of an auxiliary power unit for a vehicle, and wherein the auxiliary power unit provides power to components of the vehicle when the vehicle is not running.

18. A method of regenerating a diesel particulate filter, the diesel particulate filter configured to capture particulate matter exhausted from a diesel engine, the method comprising:
    detecting a particulate matter accumulation level within the diesel particulate filter with a first sensor;
    detecting an ambient temperature of an environment surrounding the diesel particulate filter with a second sensor;
    adjusting a first regeneration threshold based on the detected ambient temperature; and
    initiating regeneration of the diesel particulate filter when the detected particulate matter accumulation level reaches the first regeneration threshold.

19. The method of claim 18, further comprising increasing the first regeneration threshold when the detected ambient temperature increases.

20. The method of claim 18, further comprising decreasing the first regeneration threshold when the detected ambient temperature decreases.

21. The method of claim 18, further comprising initiating regeneration of the diesel particulate filter within a regeneration window defined between the first regeneration threshold and a second regeneration threshold, wherein the second regeneration threshold corresponds to a maximum particulate matter accumulation level within the diesel particulate filter.

22. The method of claim 21, wherein the first regeneration threshold is set a predetermined length of time before the particulate matter accumulation level reaches the second regeneration threshold.

23. The method of claim 22, wherein the regeneration window remains constant as the control module adjusts the first regeneration threshold relative to the second regeneration threshold to compensate for the detected ambient temperature.

24. The method of claim 18, wherein the first sensor is a pressure sensor coupled to the diesel particulate filter, and further comprising detecting exhaust backpressure within the diesel particulate filter with the pressure sensor, wherein the detected exhaust backpressure corresponds to the particulate matter accumulation level within the diesel particulate filter.

25. The method of claim 18, further comprising activating a heating element coupled to the diesel particulate filter to heat the diesel particulate filter during regeneration.

* * * * *